United States Patent
Horiuchi et al.

(10) Patent No.: US 6,529,838 B1
(45) Date of Patent: Mar. 4, 2003

(54) METHOD OF AND APPARATUS FOR PREDICTING VEHICLE INTERIOR NOISE

(75) Inventors: Mamoru Horiuchi, Tokyo (JP); Akira Suto, Saitama-ken (JP); Yuichi Yoshimura, Saitama-ken (JP); Ken Kudo, Saitama-ken (JP); Tsuyoshi Yamashita, Saitama-ken (JP)

(73) Assignees: Bridgestone Corporation, Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 09/097,588

(22) Filed: Jun. 16, 1998

(30) Foreign Application Priority Data

Jun. 16, 1997 (JP) ............................................. 9-158929

(51) Int. Cl.[7] ............................................. G01M 17/02
(52) U.S. Cl. .............................. 702/41; 702/56; 702/76; 702/183; 702/191; 381/71.4; 381/86; 700/280; 703/8
(58) Field of Search ............................. 702/41, 33, 39, 702/42, 43, 56, 75–77, 103, 105, 106, 108, 109, 111, 113–115, 124, 126, 138, 140, 182, 183, 188, 189, 191, 193–195, FOR 123, FOR 124, FOR 126, FOR 134, FOR 135, FOR 143, FOR 166, FOR 168, FOR 170, FOR 171; 73/146, 8, 570, 579, 581, 587, 602, 645–648; 381/71.12, 56, 71.1, 71.4, 86; 700/280; 703/7, 8

(56) References Cited

U.S. PATENT DOCUMENTS

| 5,003,819 A | 4/1991 | Koopman ..................... 73/146 |
| 5,384,853 A | 1/1995 | Kinoshita et al. ......... 381/71.12 |
| 5,572,440 A * | 11/1996 | Harashima et al. ......... 700/280 |
| 5,805,457 A * | 9/1998 | Sanders ....................... 702/124 |
| 6,192,745 B1 * | 2/2001 | Tang et al. .................... 73/146 |

FOREIGN PATENT DOCUMENTS

JP 07-055649 3/1995

OTHER PUBLICATIONS

Roggenkamp T.J. et al; "Development of experimentally based structural/acoustic automobile tire noise models", Noise–Con 94 Proceedings: 1994 Nat. Conference Control Engineering., pp. 111–116, XP002116144, 1994. (No Month ):
"Trend of the Study on Road Noise" *Automobile Technology*, vol. 49, No. 1, Kamada and Magoshi, 1995, pp. 88–93, (No Month). (No Formulation).

* cited by examiner

*Primary Examiner*—Hal Wachsman
(74) *Attorney, Agent, or Firm*—Sughrue Mion, PLLC (57) ABSTRACT

A jig is successively mounted on each of the four wheels of a vehicle. The jig is struck in three orthogonal directions independently, and at the same time, a microphone inside the vehicle measures the sound pressure of noise generated due to the exciting force. An FFT analyzer operates a frequency response function from the exciting force to the sound pressure. In a drum testing machine, a tire to be subject to noise prediction is mounted on a shaft, the tire is rotated, and the axial force in the three orthogonal directions is measured. The axial force signal is input to the FFT analyzer and the auto power spectrum in the three orthogonal directions and the cross power spectrum between two different axial directions are operated. The frequency response functions are synthesized with the auto power and cross power spectrums, and the power spectrum of the road noise is operated.

12 Claims, 9 Drawing Sheets

METHOD OF AND APPARATUS FOR PREDICTING VEHICLE INTERIOR NOISE

BACKGROUND OF THE INVENTION

1. Field of the Invention

The present invention relates to a method of and an apparatus for predicting vehicle interior noise (vehicle interior sound), and more particularly, to a method of and an apparatus for predicting vehicle interior noise in which the vehicle interior noise caused by an irregular road surface can be easily predicted.

2. Description of the Related Art

In recent years, the demands of ordinary consumers for less noise have increased. In the same way, automobile buyers are also asking for vehicles making less noise. One way of reducing the noise of an automobile is to reduce the noise generated inside a vehicle by the excitation, via the suspension, of the vehicle body by the exciting force generated on the tires when a vehicle travels over a slightly uneven road surface such as a tough paved road or the like, (i.e. road noise). If the tire, as one part of the vehicle, is focused on as the phenomenon causing this road noise, then generally, from the standpoint of the vehicle, the quality of the vehicle is altered by the specifications of the tire, such as structure and quality of the materials. From the standpoint of the tire, the level and tone quality of the noise is altered by the specifications of the vehicle. Thus it is clear that the characteristics of both the tire and the vehicle are linked together. At sites of product development of tires or the like, it has been experienced, though not so frequently, that the superiority and inferiority between tires having different specifications may be reversed due to the specifications of the vehicles used in the running tests.

A method of predicting road noise which uses experimental values in combination is described in "Trend of the Study on Road Noise" (Automobile Technology, Vol. 49, No. 1, 1995, pp. 88–93).

In this reference, from a long-term point of view, it is ideal if vehicle internal noise up to a frequency of about 500 Hz such as road noise can be predicted by a calculation model using a finite element method or the like, and it is a matter of course that such research is being advanced. However, in the present state, high accuracy is not obtained even if the vibration analysis of a structual body such as a vehicle body having a complicated and enormous degree of variance is effected up to a high frequency (approximately 500 Hz). Accordingly, it is stated in the reference that the method using experimental values in combination is the mainstream.

This method using experimental values in combination is also called a transfer function synthesis method or a substructure synthesis method. In this method, a vehicle is separated into two components, i.e., a vehicle body and a suspension, and vibration noise within the vehicle is predicted from the vibration characteristics of each of the components. The vibration characteristics (i.e., transfer function or frequency response function) of each of the components may be obtained by the calculation model using the finite element method, or may be obtained by using experimental values. Alternatively, the finite element method and experimental values can be used in combination.

When the finite element method and the experimental value are used in combination, the vibration characteristics of the suspension are obtained by the calculation model using the finite element method, the vibration characteristics of the vehicle body, at a point located above the point where the suspension is mounted, are obtained by using a frequency response function which has been actually measured, and the system characteristics from axle input to vehicle interior noise are obtained in accordance with the transfer function synthesis method. In order to predict road noise by this method, it is necessary to have an exciting force input to the system. As a result, in this method, a driving-point innertance matrix (3×3) at the time the axle is excited is actually measured, the acceleration (three orthogonal axial directions) of the vehicle axle portion when the vehicle is actually running on a rough road surface is measured, and the measured value of this acceleration is multiplied by the inverse matrix of the innertance matrix. The exciting force input to the axle is thereby estimated by inverse operation. At this time, in order to minimize error s generated by using the measured data in the calculated values of the inverse matrix, the accuracy of prediction is improved by applying a mathematical technique such as singular value decomposition. The interior noise serving as an output is predicted by finally multiplying the exciting force input to the axle, which was estimated in this way, with the system transfer function.

A principal object of the above-described conventional road noise predicting method is to obtain a guideline for improving the two components on the vehicle side, i.e., the suspension and the vehicle body. The input from the tire is obtained as a representative value by the aforementioned inverse operation, and is provided only as a boundary condition. Accordingly, it is not appropriate to use in obtaining a guideline for improving the tire.

Moreover, from the standpoint of the tire, it is sufficient if the characteristics of the vehicle are simply taken as being the total characteristics of the vehicle above the axle only. Thus, it is not always necessary to subdivide the vehicle components into suspension model transfer characteristics and vehicle body transfer characteristics. However, in the above-described conventional road noise predicting method, the vehicle is divided into two components. Accordingly, it is not practical only to improve the tire and thereby a simpler method is desired.

Further, it is considered that the above-described conventional road noise predicting method is applied to the tire, that the respective tires having different specifications are subjected to the above-described inverse operation, and that the road noises of the respective tires having different specifications are compared. However, in order to implement this, it is necessary that the respective tires having different specifications be replaced and mounted on the axles and that the vehicles on which the tires are mounted be subjected to actual running. As a result, it is the same as when the tires are replaced on the actual vehicle and the interior sound is directly evaluated. A drawback arises in that a great amount of time and labor is required.

SUMMARY OF THE INVENTION

The present invention was developed in order to solve the above-described drawbacks, and the object thereof is to provide an apparatus for and a method of predicting vehicle interior noise in which road noise can be easily predicted by using a transfer function synthesis method.

The principle of the present invention will be explained. Firstly, the components of a vehicle as a whole which affect road noise are broken down into two parts, i.e., the tires and the portion of the vehicle above the axles, and the above-described transfer function synthesis method is applied.

As described above, with regard to the components of the vehicle, since the calculation model in which the vehicle is broken down into the suspension and the vehicle body is not practical, it is appropriate to use the actually-measured transfer function. In the original transfer function synthesis method, transfer characteristics, which are obtained by exciting the axle of the vehicle on which a tire is not mounted, should be used as the transfer characteristics from the axle of the vehicle to the vehicle interior sound. However, in order to obtain the transfer characteristics by exciting the axle of a vehicle on which a tire is not mounted, it is necessary that a state which is the same as the state in which a tire is mounted on the axle and a load is applied thereto be created in a state in which a tire is not mounted on the axle and without applying excessive force thereto. Accordingly, it is necessary to provide enormously complicated equipment in the experiment, and a great number of technical difficulties can be anticipated. Thus, it is not practical.

Therefore, as the transfer characteristics from the axle of the wheel portion to the interior sound, the inventors have decided to use the vehicle in a state in which a load is naturally applied to the axle while a tire is mounted thereon and use the transfer characteristics from the exciting force to the vehicle interior sound when the axle is excited in the predetermined directions.

The transfer characteristics are not purely the transfer characteristics of only the vehicle portion but are the characteristics where a portion of the characteristics of the mounted tire are included. However, as will be described later, the inventors confirm that theoretically the vehicle interior sound can be obtained correctly.

Figure 4:
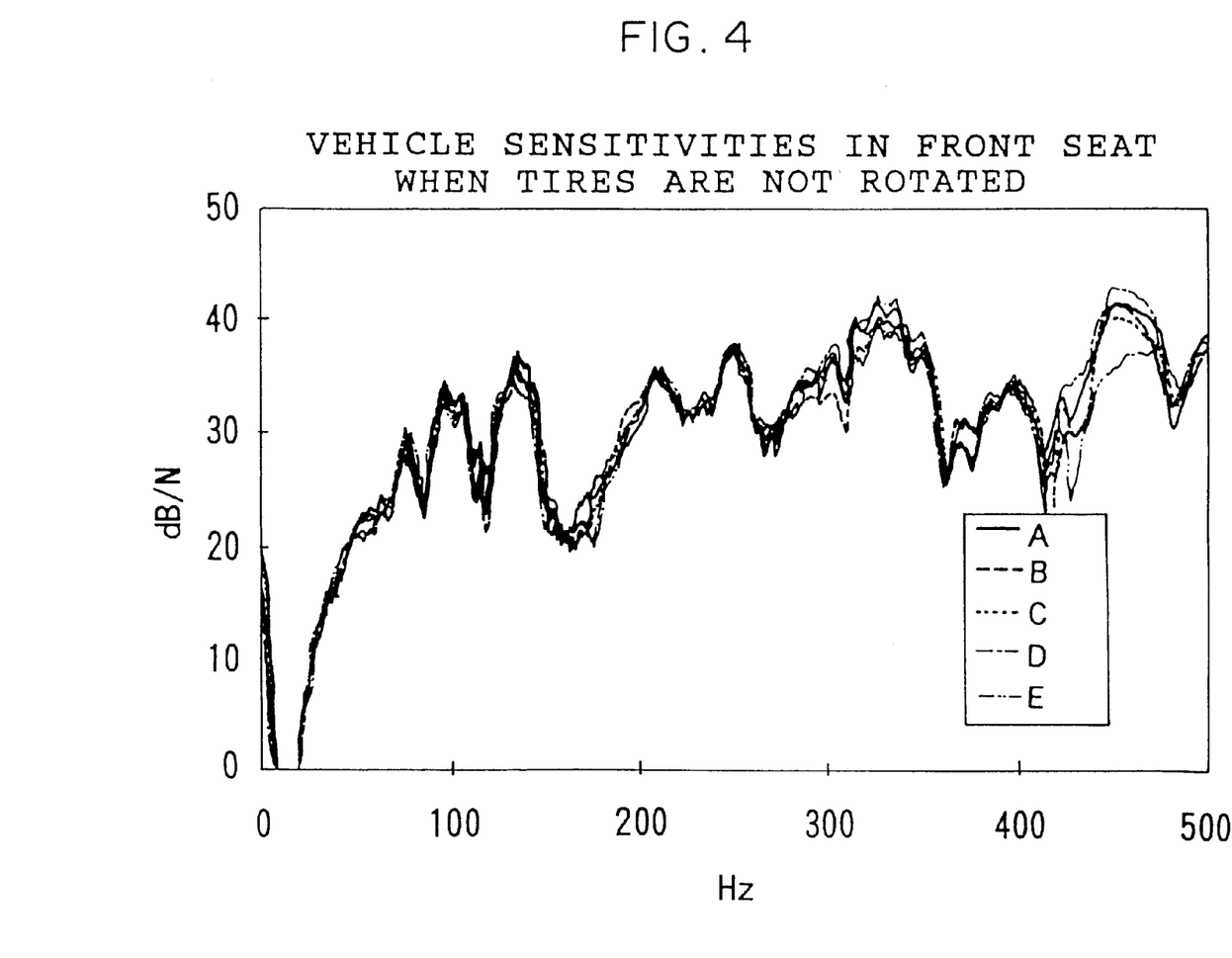
FIG. 4 is a wave form chart which shows front seat vehicle sensitivities when various types of tires are not rotated.

The transfer characteristics from the axle to the interior sound can be obtained with the tire which is to be subject to noise prediction (hereinafter—"the subject tire") mounted on the vehicle, however, when there is a plurality of subject tires, it is necessary to replace the subject tires in order to obtain each tire's transfer characteristics, and is therefore troublesome. On the other hand, as shown in FIG. 4, in accordance with the experiment, the inventors confirm that, if the sizes of the tires are the same, the vehicle sensitivities at the time of excitation are substantially the same even if the specifications of the tires are different. FIG. 4 shows the vehicle sensitivities in the front seats when tires A through E having different specifications are not rotated. In the present invention, standard tires are used as those mounted on the vehicle and exciting force is applied to the axles of the vehicle on which the standard tires are mounted. Accordingly, the transfer function from the exciting force to the vehicle interior sound is obtained. In this way, it is no longer necessary to replace the tires of the vehicle, and the transfer characteristics from the axle to the vehicle interior sound can be easily obtained.

Ideally, it is desirable that the characteristics of the tire serving as another component can be expressed by a precise calculation model. However, because such a model is not yet practical at present, it is necessary to use the experimental data. Consequently, as the characteristics of the tire, the inventors decided to use, in a room, the axial force in the above-described predetermined directions (the directions in which the axle of the vehicle, on which the tire is mounted, is excited) which is generated at the shaft of the subject tire when the subject tire is rotated in an axially fixed state on a drum testing machine, i.e., when the subject tire is run in simulation on a drum testing machine having a surface simulating the unevenness of a road surface such as a roughly paved road.

As will be described later, in accordance with the transfer function synthesis method, the transfer function of the above-described vehicle and the power spectrum relating to the axial forces of the tire in the above-described predetermined directions are multiplied for every direction and for every position of the vehicle, at which the tire is mounted, in the frequency area, and the obtained products are added together. The inventors find that the auto power spectrum of the vehicle interior sound when the vehicle runs on an uneven road surface such as a roughly paved road and the like is reproduced. More specifically, the transfer function of the above-described vehicle and the power spectrum of the axial force of the tire are multiplied for every corresponding direction and for every position at which the tire is mounted, and the obtained products are added together. The auto power spectrum of the vehicle interior sound can be thereby obtained.

Next, description will be given of how the vehicle interior sound is accurately obtained by using the characteristics including a portion of the characteristics of the mounted tire. In order to simplify the description, the hypothential interior sound of a vehicle which is generated when only one wheel of a vehicle runs on an uneven road surface is considered. This is because, regarding the vehicle interior sound due to a random road surface input such as road noise, it is considered that the correlation between the road surface inputs from the respective wheels is small, and that the vehicle interior sound due to all of the four wheels can be given by the sum (power addition) of the contributions from the respective wheels. The inventors confirm that this is approximately achieved in the experiment in which each of the four wheels of the vehicle is loaded on the indoor drum testing machine. Further, in order to simplify the explanation, the directions to which the exciting force is applied are three orthogonal axes (X is the longitudinal direction of the vehicle; Y is the transverse direction of the vehicle; and Z is the vertical direction of the vehicle).

As the characteristics of the vehicle only, a driving point moving rigidity matrix of the axle of the vehicle, on which the tire is not mounted, is $K^{(s)}=[K_{ij}^{(s)}]$ (wherein, i, j=X, Y, Z), and the transfer function vector from the displacement of the vehicle axle on which the tire is not mounted, to the interior sound is $\{S_i\}$ (wherein, i,j=X, Y, Z). As the characteristic of the tire only, an axial driving point moving rigidity matrix when the ground-contacting point of the tire is fixed and the axis is free is $K^{(22)}=[K_{ij}^{(22)}]$ (wherein, i, j=X, Y, Z). Also, as the characteristic of the tire only, a transfer moving rigidity matrix when the axis is fixed and the ground-contacting point is excited is $K^{(21)}=[K_{ij}^{(21)}]$ (wherein, i,j=X, Y, Z). An equivalent displacement input vector to the ground-contacting point of the tire due to the unevenness of the road surface is $\{X_i^{(1)}\}$ (wherein, i=X, Y, Z). In accordance with the transfer function synthesis method, the vehicle interior noise when the vehicle runs on an uneven road surface is given in the following formula, wherein T is a transposition.

$$P = -\{S_i\}^T (K^{(s)}+K^{(22)})^{-1} K^{(21)} \{X_i^{(1)}\} \quad (1)$$

On the other hand, in accordance with the present invention, as the transfer function of the vehicle, a transfer function vector from the axle exciting force to the vehicle interior sound when the axle is excited with a tire mounted is $\{G_i\}$ (wherein, i=X, Y, Z) and, as the characteristic of the tire, a tire axial force vector when the subject tire is traveled on the drum testing machine in an axially fixed state is $\{F_i\}$ (wherein, i=X, Y, Z). The following formula can be introduced from the transfer function synthesis method in the same manner as described above.

$$\{G_i\}^T = -\{S_i\}^T (K^{(s)}+K^{(22)})^{-1}$$

$$\{F_i\} = K^{(21)}\{X_i^{(1)}\} \quad (2)$$

The following formula is obtained from the above-described formulas (1) and (2).

$$P = \{G_i\}^T\{F_i\} \quad (3)$$

In this way, it can be understood that theoretically the vehicle interior sound is correctly obtained by using the transfer function vector $\{G_i\}$ and the tire axial force vector $\{F_i\}$ of the present invention.

When the above-described formula is expanded into components, the following formula is obtained.

$$P = G_X F_X + G_Y F_Y + G_Z F_Z \quad (4)$$

In order to obtain the power spectrum of the vehicle interior sound from the above-described formula (3), it suffices that a conjugate complex amount be multiplied, the square of the absolute value of the formula (3) be operated, and the time average be calculated.

$$\overline{|P|^2} = \overline{(G_X F_X + G_Y F_Y + G_Z Y_Z)(G_X F_X + G_Y F_Y + G_Z F_Z)^*} \quad (5)$$

"*" in the above-described formula (5) means a conjugate complex amount.

The expansion and arrangement of the above formula (5) is as follows.

$$\overline{|P|^2} = |G_X|^2 \overline{|F_X|^2} + |G_Y|^2 \overline{|F_Y|^2} + |G_Z|^2 \overline{|F_Z|^2}$$

$$+ 2\mathrm{Re}(G_X G_Y^* \overline{F_X F_Y^*} + G_Y G_Z^* \overline{F_Y F_Z^*}$$

$$+ G_Z G_X^* \overline{F_Z F_X^*}) \quad (6)$$

Re( ) in the above-described formula (6) means the real number portion of the complex number in ( ).

Therefore, in accordance with the transfer function synthesis method, the transfer function of the vehicle and the power spectrum relating to the tire axial force in the predetermined directions are multiplied for every related direction in the frequency area and the obtained products are added together. More specifically, the transfer function of the vehicle and the power spectrum of the tire axial force are multiplied for every corresponding direction and the obtained products are added together. In this way, the auto power spectrum of the vehicle interior sound when one wheel runs on an uneven road surface such as a rough paved road or the like can be reproduced. Further, the vehicle interior sound of all of the four wheels can be obtained by summing the auto power spectrums of respective wheels.

In the above-described formula (6), the first three terms on the right-hand side are the components based on the auto power spectrums in three orthogonal axial directions of the axial force and the remaining three terms are components based on the cross power spectrums between two different axial directions. While the components based on the auto power spectrums are invariably positive, the components based on the cross power spectrums can be positive or negative. The contributions of the tire axial force in the respective directions with respect to the road noise can be known from these components. Namely, the transfer function is multiplied by the auto power spectrum and the transfer function is multiplied by the cross power spectrum for every related axial direction and for every related position at which the tire is mounted, and the obtained products are added together. Accordingly, the auto power spectrum inside the vehicle can be reproduced and the vehicle interior noise can be predicted from the auto power spectrum inside the vehicle.

On the basis of the above-described principle, in a method of predicting vehicle interior noise: exciting force is applied to the axle of a vehicle on which standard tires are mounted in predetermined directions, the applied exciting force and the sound pressure of the noise generated inside the vehicle due to the applied exciting force are measured, the frequency response function in which the exciting force in said predetermined directions serves as an input and the sound pressure of the noise generated inside the vehicle serves as an output is obtained, and axial force whose directions are the same as said predetermined directions and which is generated at a axle when a tire which is to be subject to noise prediction is rotated in an axially fixed state on a drum testing machine having a surface simulating the unevenness of a road surface is measured, and the power spectrum relating to the measured axial force in said predetermined directions is obtained; and on the basis of said frequency response function and said power spectrum, predicting vehicle interior noise which is generated when a vehicle runs on a road surface similar to said road surface. A transfer function can be used as the frequency response function.

In the method of predicting vehicle interior noise according to the present invention, the frequency response function and the power spectrum may be obtained simultaneously or one of them may be obtained in advance of the other.

As the above-described predetermined directions, three directions consisting of the three orthogonal axial directions formed by the axis in the longitudinal direction of the vehicle, the axis in the transverse direction of the vehicle, and the axis in the vertical direction of the vehicle; six directions consisting of the three orthogonal axial directions and encircling the three orthogonal axes (moments around the axes); and necessary directions from among the three orthogonal axial directions and the encircling the three orthogonal axes can be used. The exciting force can be independently applied to the axle in the predetermined directions. However, if the moment around the axis is taken into consideration, it is difficult to apply the moment independently. As a result, if the moment around the axis is taken into consideration, the distance (length of the arm of the moment) from the wheel center, i.e., the point of intersection between the equatorial plane of the tire and the axis of the tire, to the position to which the exciting force is applied may be increased and added to the axial direction force applied to each of the three orthogonal axes. At this time, a plurality of positions to which the exciting force is applied is selected, and the transfer function due to the moment and the transfer function due to the axial direction force are separated by calculation from the data in which only the direction of the axial direction force is excited so as to be inverted without changing the direction of the moment. Namely, mathematically, it suffices if the exciting force be applied in six directions (the positions to which the exciting force is applied are also changed) which have been properly selected so as to solve simultaneous linear equations having six unknowns (transfer functions).

If two or more directions are used as the predetermined direction, the auto power spectrum in the predetermined directions and the cross power spectrum between the two different axial directions may be obtained as the power spectrum.

When three orthogonal axial directions are used as the predetermined directions and the auto power spectrum and the cross power spectrum are used as the power spectrum, the exciting force is applied to the axle of a vehicle on which standard tires are mounted in three orthogonal axial directions, for each of the three orthogonal axes, the applied exciting force and the sound pressure of the noise generated inside the vehicle due to the applied exciting force are measured for each of the three orthogonal axes, the frequency response function in which the exciting force in the three orthogonal directions serves as an input and the sound pressure of the noise generated inside the vehicle serves as an output is obtained for each of the three orthogonal axes. At the same time, the axial force in the three orthogonal axial directions which is generated at the axle when a noise prediction subject tire is rotated in an axially fixed state on a drum testing machine having a surface simulating the unevenness of a road surface is measured for each of the three orthogonal axes, and the auto power spectrum of the measured axial force in each of the three orthogonal axial directions and the cross power spectrum in the direction between two different axes of the three orthogonal axes are obtained. On the basis of the frequency response function, the auto power spectrum, and the cross power spectrum, the vehicle interior noise which is generated when the above-described vehicle runs on a road surface similar to the road surface is predicted.

Further, an apparatus for predicting vehicle interior noise, comprising: excitation means which applies exciting force in predetermined directions to an axle of a vehicle on which standard tires are mounted; first measuring means which measures the applied exciting force and the sound pressure of the noise generated inside a vehicle due to the exciting force; function operating means which operates the frequency response function in which the exciting force in said predetermined directions serves as an input and the sound pressure of the noise generated inside the vehicle serves as an output; a drum testing machine which has a surface simulating the unevenness of a road surface; second measuring means for measuring the axial force whose directions are the same as said predetermined directions and which is generated at an axle when a tire which is to be subject to noise prediction is rotated on said drum testing machine in an axially fixed state; spectrum operating means which operates the power spectrum relating to the measured axial force in said predetermined directions; predicting means which, on the basis of said frequency response function and said power spectrum, predicts the vehicle interior sound which is generated when the vehicle runs on a road surface similar to the above described road surface.

Moreover, an apparatus for predicting vehicle interior noise, comprising: excitation means which applies exciting force in three orthogonal directions to the axle of a vehicle, on which standard tires are mounted, for each of three orthogonal axes; first measuring means which measures the applied exciting force and the sound pressure of the noise generated inside a vehicle due to the exciting force for each of the three orthogonal axes; function operating means which operates a frequency response function for each of the three orthogonal axes in which the exciting force in the three orthogonal axial directions serves as an input and the sound pressure of the noise generated inside the vehicle serves as an output; a drum testing machine which has a surface simulating the unevenness of a road surface; spectrum operating means for measuring, for each of the three orthogonal axes, the axial force in the three orthogonal axial directions which is generated at a shaft when a noise prediction subject tire is rotated on said drum testing machine in an axially fixed state, and for operating an auto power spectrum of the measured axial force in each of the three orthogonal axial directions and a cross power spectrum in the direction between the two different axes of the three orthogonal axes; predicting means which, on the basis of said frequency response function, said auto power spectrum, and said cross power spectrum, predicts the vehicle interior noise which is generated when the vehicle runs on a road surface similar to the above-described road surface.

In the present invention, the frequency response function in which the exciting force serves as an input and the sound pressure of the noise generated inside the vehicle serves as an output is obtained using a standard tire. Consequently, even if there is a plurality of subject tires, the frequency response function from the exciting force to the sound pressure of the noise generated inside the vehicle can be easily obtained.

When the present invention is applied, guidelines for improving the characteristics of the tire and the vehicle can be obtained for effectively reducing the road noise. It becomes comparatively easy to predict the vehicle interior noise when various types of tires and various types of wheels are combined, and further, to analyze the contributions of the components.

As described hereinbefore, the method of and apparatus for predicting vehicle interior noise according to the present invention achieves a superior effect in that it becomes easy to predict road noise by using the transfer function synthesis method.

DESCRIPTION OF THE PREFERRED EMBODIMENTS

An embodiment of the present invention will be described hereinafter with reference to the drawings.

Figure 1:
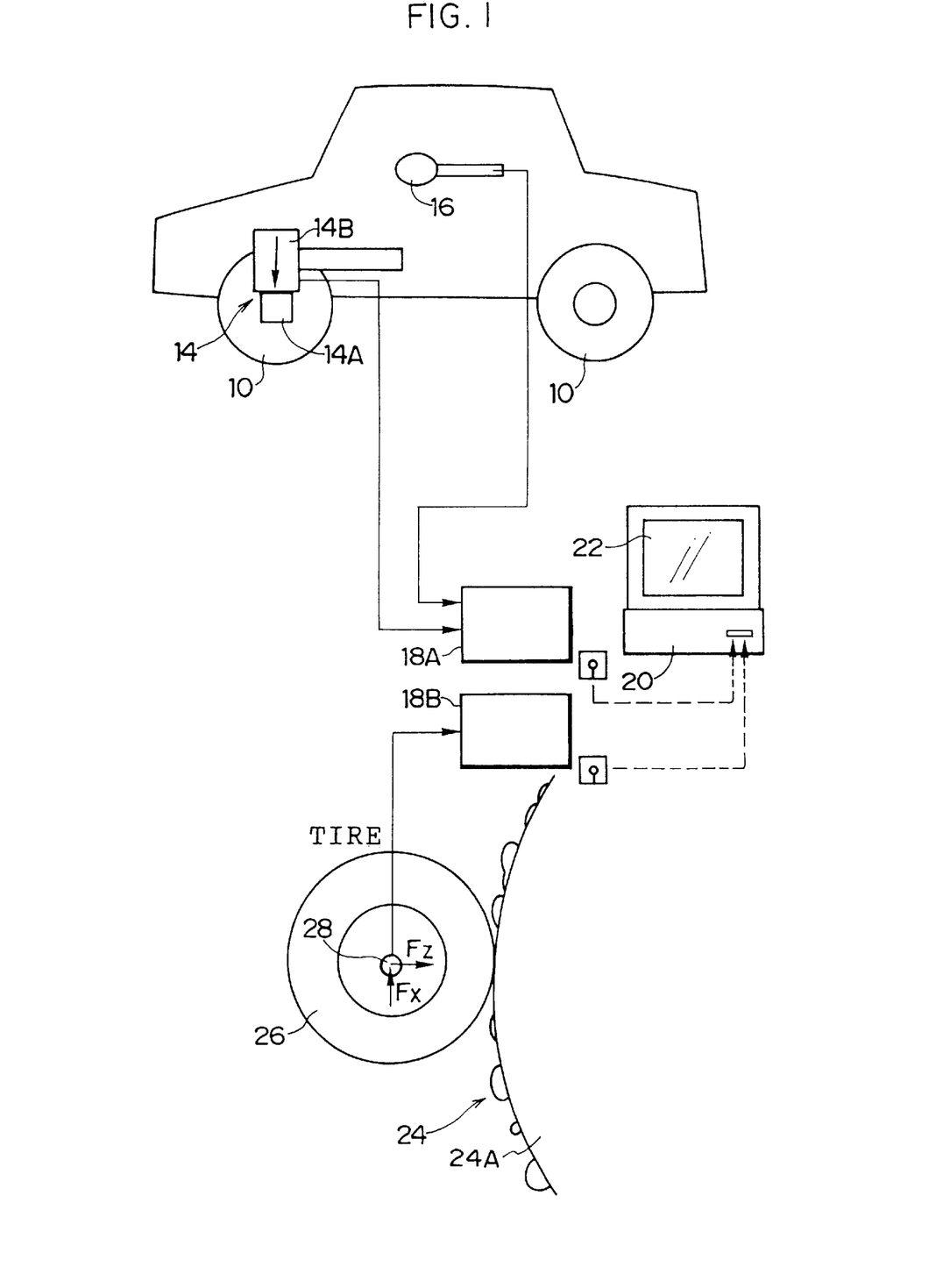
FIG. 1 is a schematic view which shows an apparatus for predicting vehicle interior noise in an embodiment of the present invention.

As shown in FIG. 1, the present embodiment includes excitation means 14 for applying exciting force in three orthogonal axial directions to the axle of a vehicle, on which standard tires 10 are mounted, for each of the three orthogonal axes.

Figure 2:
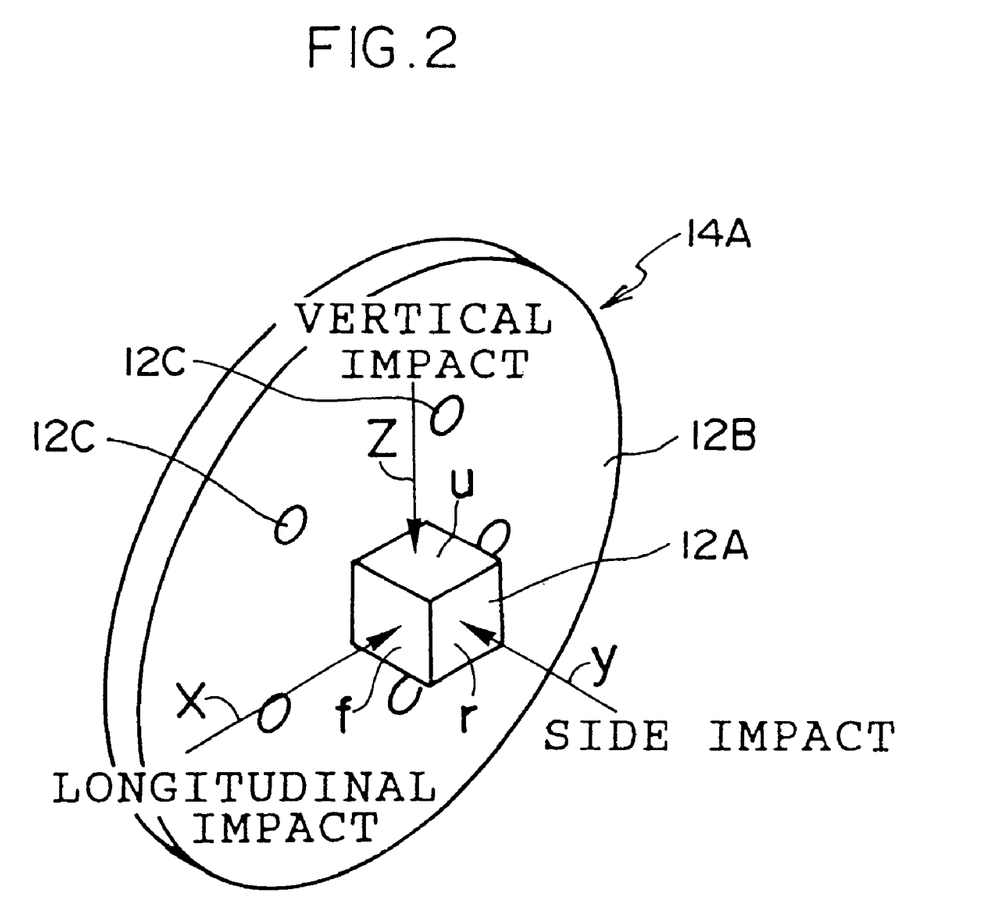
FIG. 2 is a schematic view which shows an exterior jig for striking an axle in the embodiment of the present invention.
Figure 3:
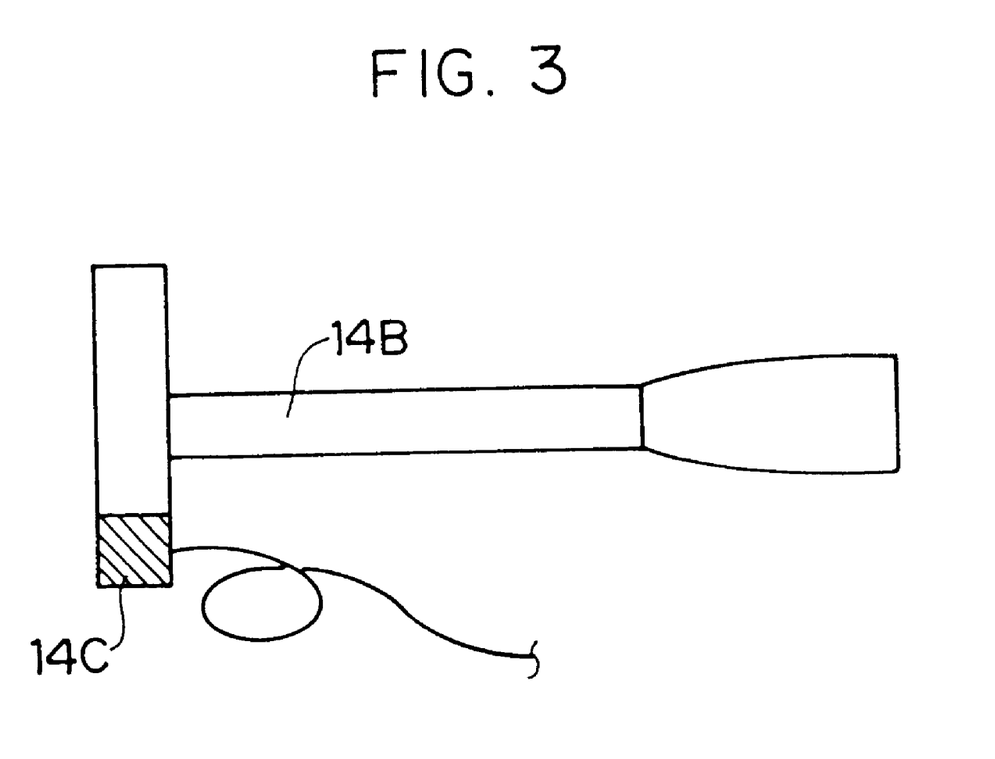
FIG. 3 is a schematic view which shows an impulse hammer in the embodiment of the present invention.

The excitation means 14 is formed by an exterior jig 14A for striking an axle (hereinafter, "exterior jig 14A") shown in FIG. 2 and an impulse hammer 14B shown in FIG. 3. The exterior jig 14A is formed integrally by a substantially cubic impact portion 12A made of a metal and a circular disc portion 12B made of a metal. Attachment holes 12C are used for attaching the jig 14A to the rim of the tire.

The exterior jig 14A is removably attached to the rim of the standard tire 10 by bolts or the like so that a vertical impact surface u of the impact portion 12A is horizontal, a longitudinal impact surface f thereof is vertical, a side impact surface r thereof is perpendicular to the axle, and the surface of the disc portion 12B at the rim abuts the boss portion of the axle. When the three orthogonal axes are X-axis, Y-axis, and Z-axis, respectively, it is determined that the X-axis be the longitudinal direction of a vehicle, the Y-axis be the transverse direction of a vehicle, and the Z-axis be the vertical direction of a vehicle.

Further, the impulse hammer 14B is structured so that a hard rubber member is adhered to the impact surface of the head portion of the hammer 14B and a force sensor 14C which includes a piezoelectric element or the like is fixed thereto.

A microphone 16 which detects the sound pressure of the noise generated inside the vehicle due to the applied exciting force is disposed at the position of measurement inside the vehicle. As the position of measurement, a position which corresponds to the head portion of a driver, a position which corresponds to the head portion of a passenger, a position in the center of the vehicle, or the like can be selected.

The microphone 16 is connected to an input channel of a fast Fourier transform (FFT) analyzer 18A. The force sensor 14C of the impulse hammer 14B is connected to the other input channel of the FFT analyzer 18A. The FFT analyzer 18A includes a floppy disk drive and analyzed data is recorded onto a floppy disk. The data recorded onto the floppy disk is processed by a personal computer 20 includes a CRT 22.

A drum testing machine 24 is formed by a drum 24A having a surface which simulates the unevenness of a road surface on a test course for evaluating road noise, a motor which rotates the drum 24A, and an axle for mounting a subject tire.

A subject tire 26 is rotatably mounted on the axle in an axially fixed state so that the ground-contacting portion of the tire 26 contacts the surface of the drum 24A at a predetermined load. A load cell 28, which measures axial force in three orthogonal directions which are the same as the above three orthogonal directions, and whose frequency response characteristics are good up to the high frequency area, is attached to the axle for mounting the subject tire 26. The load cell 28 is connected to the input channel of an FFT analyzer 18B. The FFT analyzer 18B also includes a floppy disk drive in the same manner as the above-described FFT analyzer 18A, and analyzed data is recorded onto a floppy disk. The data recorded onto the floppy disk is processed by the personal computer 20.

Figure 5:
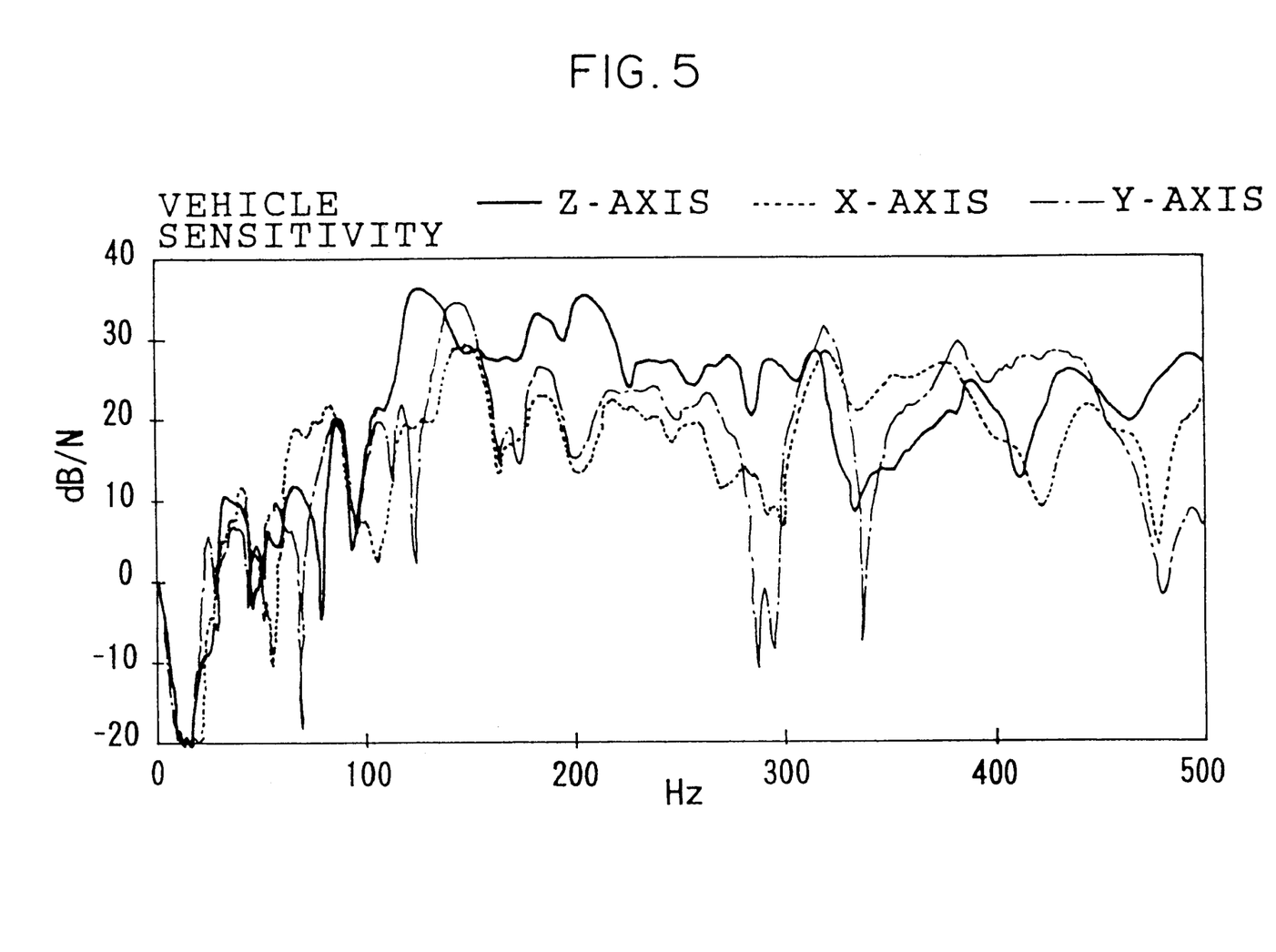
FIG. 5 is a wave form chart which shows an example of frequency response functions in the embodiment of the present invention.

Next, the operation of the present embodiment will be explained. The exterior jig 14A is attached to one of the four wheels. As the vertical impact surface, the longitudinal impact surface, and the side impact surface are independently struck by the impulse hammer 14B, the boss portion of the axle is struck via the exterior jig 14A. At the same time that the boss portion is struck, the sound pressure of the noise generated due to the exciting force of the impact is measured by the microphone 16 for measuring noise which is provided at the position of measurement inside the vehicle. In this way, an exciting force signal from the impact and a sound pressure signal from the noise generated due to the exciting force are input to the FFT analyzer 18A. The frequency response function, i.e., the transfer function, up to predetermined frequency (500 Hz in the present embodiment) is obtained for each shaft and recorded onto the floppy disk. FIG. 5 shows an example of the frequency response functions.

In the present embodiment, the analysis conditions of the FFT analyzer 18A are determined as follows:
 block size: 1024;
 frequency resolution: 1.25 Hz;
 sampling frequency: 1280 Hz.

After a frequency response function has been obtained for each of the axes X, Y, Z for the first wheel, the exterior jig 14A is removed from the one wheel and attached to another wheel. In the same way as described above, a frequency response function is obtained for each of the axes X, Y, Z. Repeatedly, the frequency response functions of all of the four wheels are obtained for each of the axes and recorded onto the floppy disk.

On the other hand, in the drum testing machine 24, when the subject tire 26 is mounted on the shaft and the drum is rotated, the subject tire 26 is rotated due to the rotation of the drum and the axial force in the three orthogonal directions is measured by the load cell 28. The axial force signal is input to the input channel of the FFT analyzer 18B. The analysis conditions of the FFT analyzer 18B are the same as those of the FFT analyzer 18A.

Figure 6:
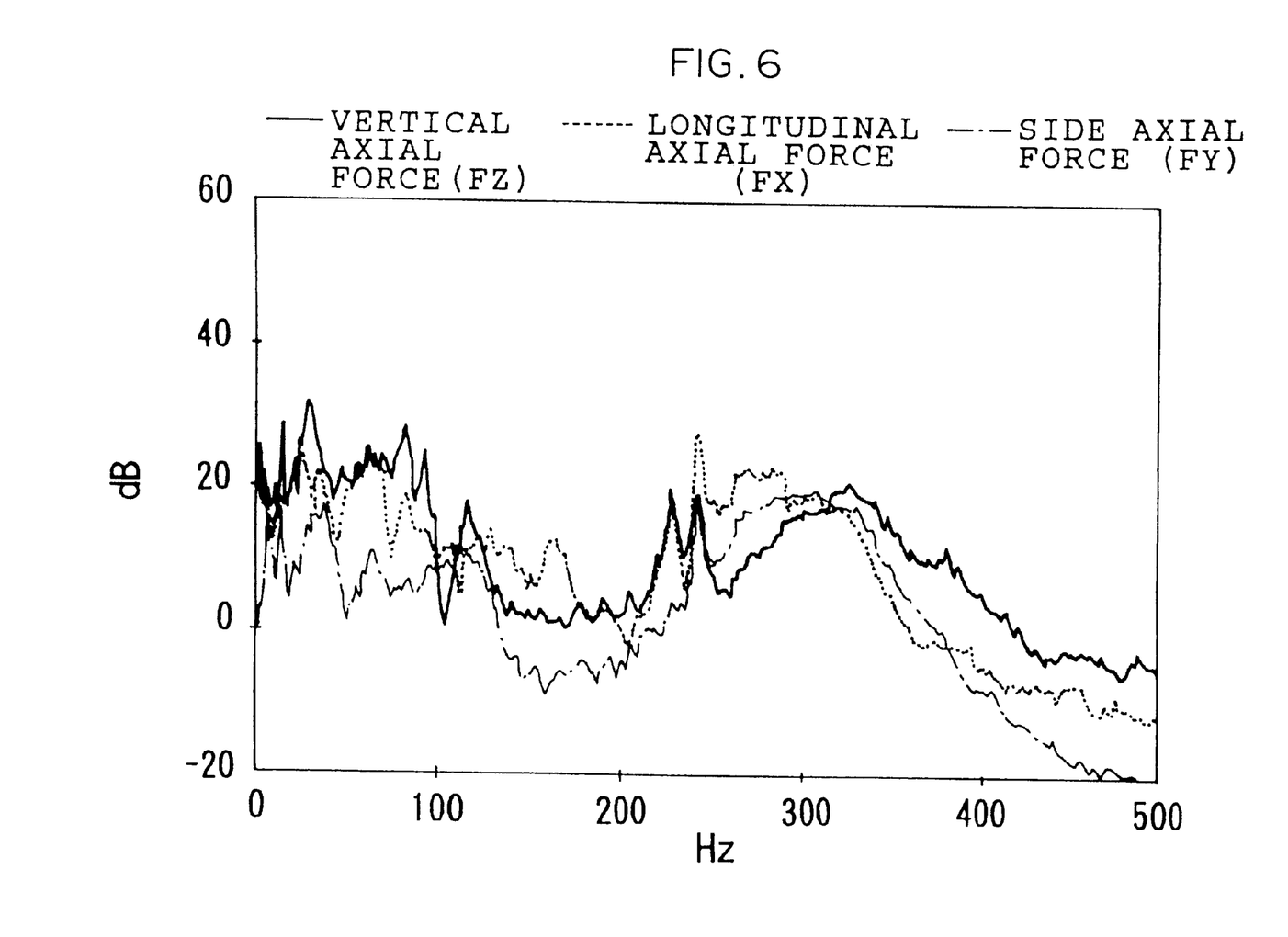
FIG. 6 is a wave form chart which shows an example of auto power spectrums in the embodiment of the present invention.
Figure 7:
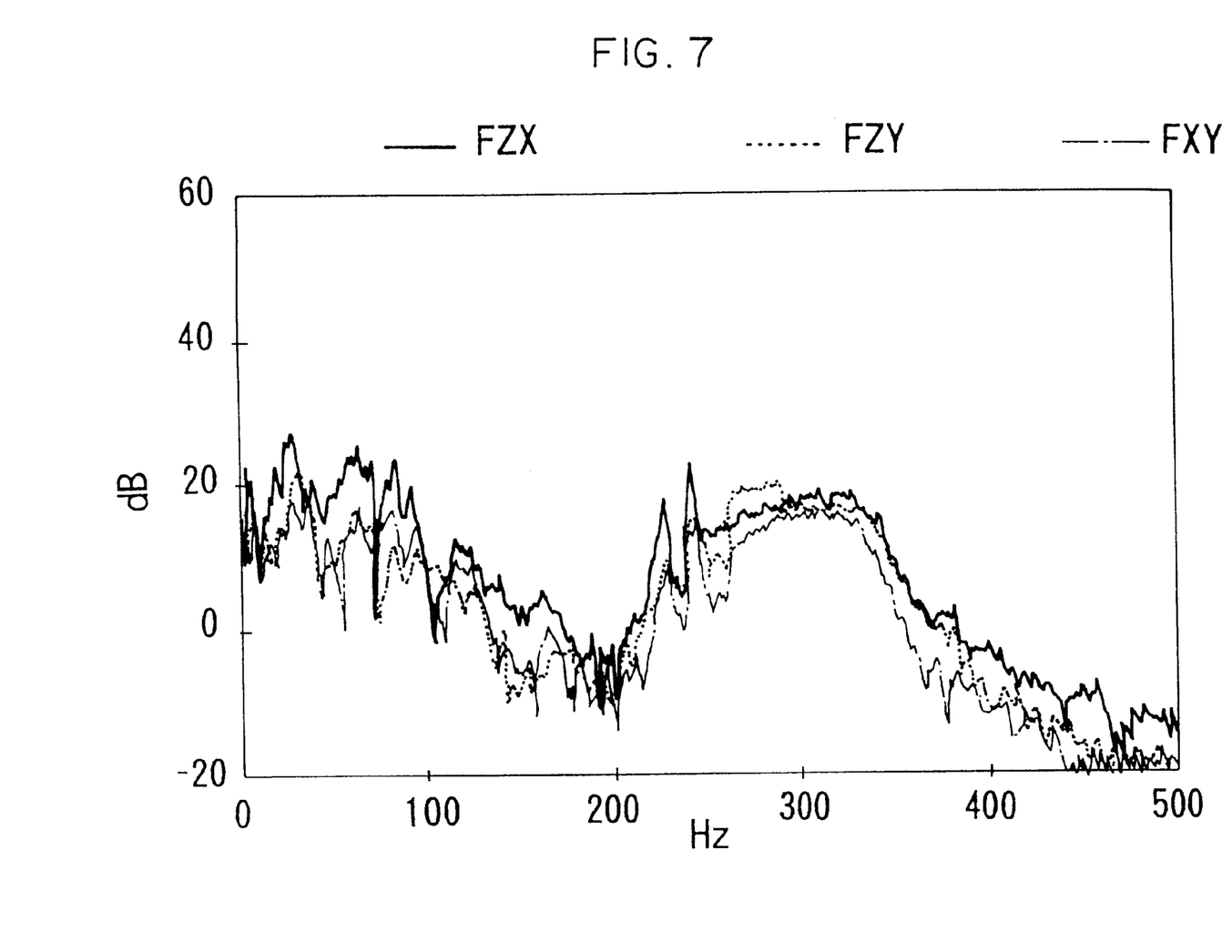
FIG. 7 is a wave form chart which shows an example of cross power spectrums in the embodiment of the present invention.

In the FFT analyzer 18B, the auto power spectrums of the axial force in the three directions of X-axis, Y-axis, and Z-axis and the cross power spectrums between the two different axial directions (XY, ZY, ZX) are operated and recorded onto the floppy disk. FIG. 6 shows an example of the auto power spectrums and FIG. 7 shows an example of the cross power spectrums. Namely, FIG. 6 shows the auto power spectrum of the vertical axial force FZ, that of the longitudinal axial force FX, and that of the side axial force FY, and FIG. 7 shows the cross power spectrum between the Z-axis and the X-axis, the cross power spectrum between the Z-axis and the Y-axis, and the cross power spectrum between the X-axis and the Y-axis.

When there is a plurality of types of subject tires 26, the subject tires 26 are replaced and the auto power spectrum and the cross power spectrum are operated for each of the subject tires 26 in the same way as described above.

Then, the floppy disk, onto which the obtained frequency response functions of the all of the four wheels of the standard tires are recorded, and the floppy disk, onto which the auto power spectrums and the cross power spectrums of the subject tires are recorded, are inserted into the personal computer 20 and the data is read. In the personal computer 20, the frequency response functions of the all of the four wheels of the standard tires, and the auto power spectrums and the cross power spectrums of the subject tires are used, and a power spectrum for every wheel is obtained on the basis of the position, at which the tire is mounted, in accordance with the above formula (6). Each of the four obtained power spectrums are synthesized and a power spectrum for the road noise is operated.

Then, the power spectrum of the road noise is displayed on the CRT in a wave form. At this time, when the wave forms of the auto power spectrums and the cross power spectrums serving as structural components of the calculated vehicle interior sound are displayed, it can be confirmed as to which power spectrum is contributing to the vehicle interior noise.

Figure 8:
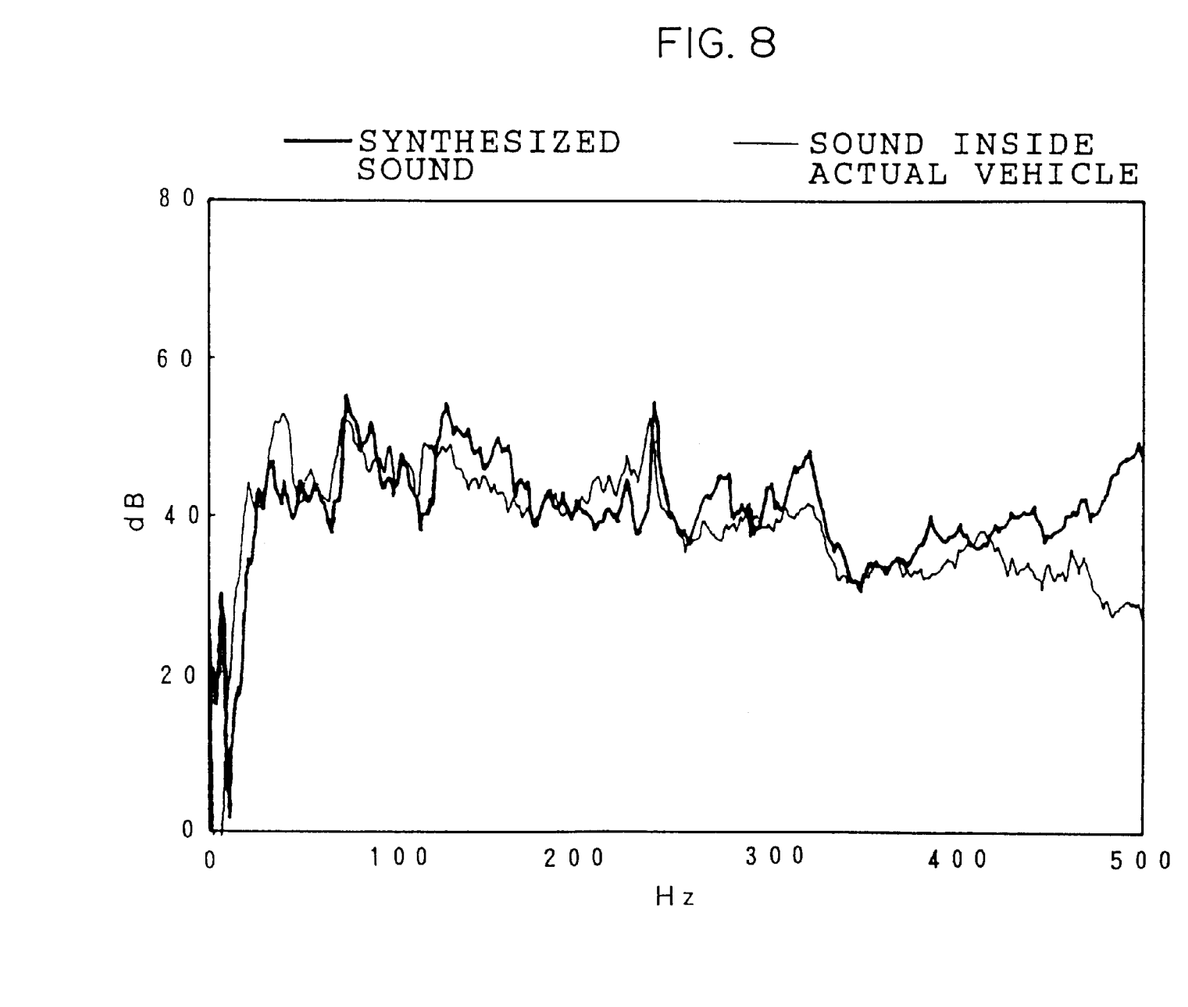
FIG. 8 is a wave form chart which shows the calculated vehicle interior sound and the measured interior sound in accordance with the embodiment of the present invention.
Figure 9:
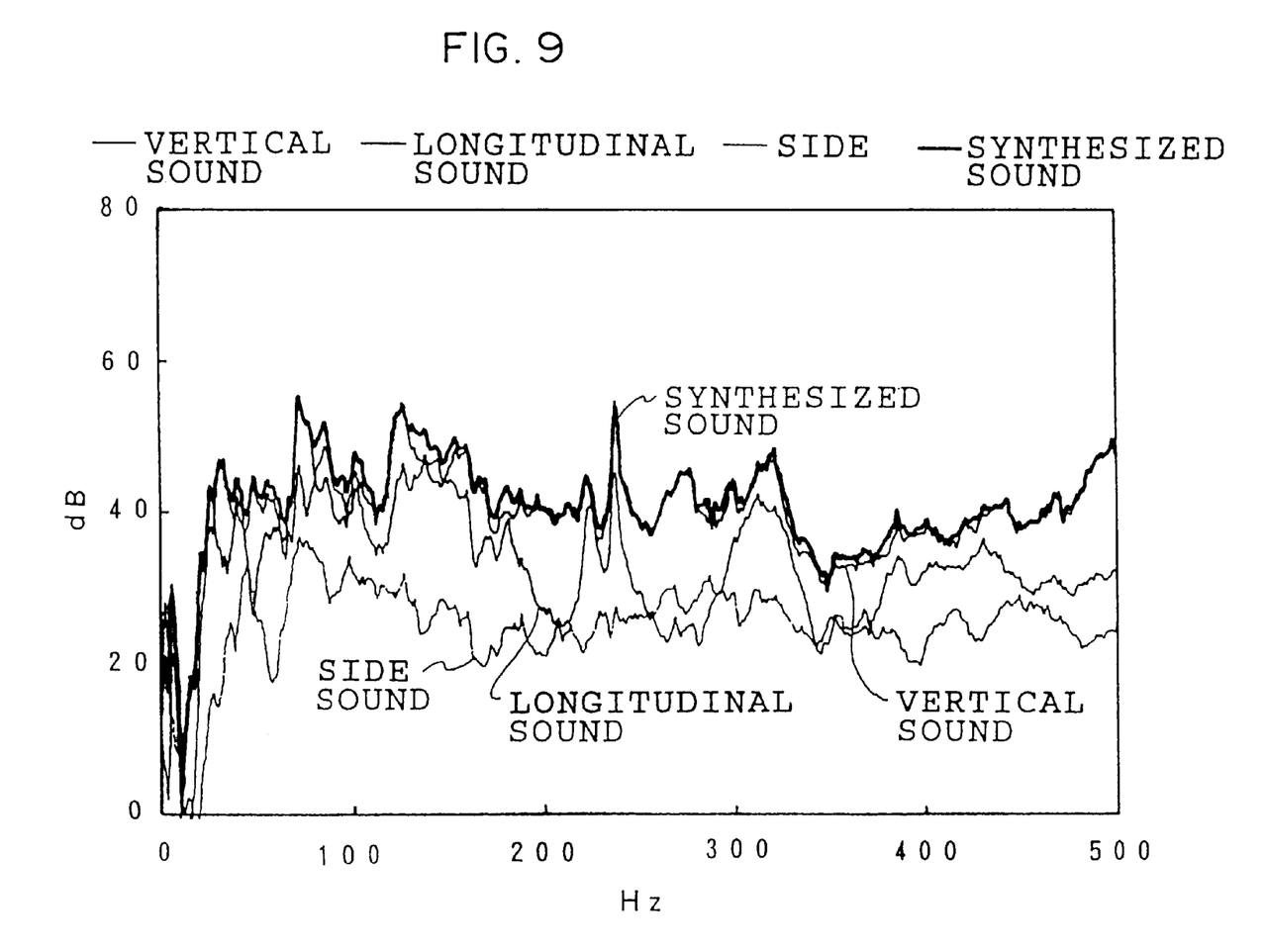
FIG. 9 is a wave form chart which shows a comparison of the calculated vehicle interior sound and partial sounds thereof in accordance with the embodiment of the present invention.

Next, the results of the comparison between the vehicle interior sound which has been predicted as described above and the vehicle interior sound which has been actually measured are shown.

vehicle: 2000 cc front engine front drive passenger car;

tire: 195/65R15;

road surface: a simulated road noise on a test course where a vehicle test has taken place;

measurement of axial force of tire inside vehicle: rough surface road drum testing machine manufactured by BRIDGESTONE CORP.;

results: FIG. 8 shows the comparison between the predicted calculated value and the measured value and FIG. 9 shows the structural components (partial sounds) of the calculated vehicle interior sound.

In the present embodiment, the manpower for obtaining the predicted spectrum of the vehicle interior sound is decreased compared to the method shown in the conventional art. Approximately, measurement of the transfer characteristic of the vehicle is one hour per car; measurement of the axial force of the tire is 0.5 hour per tire; and predicted calculation of the vehicle interior sound is 0.3 hour per tire.

In the above description, the data is recorded onto the floppy disks and processed off-line. However, it is possible for the FFT analyzers 18A, 18B to be connected to the personal computer 20 and the data to be processed on-line.

Further, in the above description, the example described is of a case in which the exciting force is applied in the three orthogonal directions. However, if the three moments around the three orthogonal axes are further added so as to predict the vehicle interior sound, the vehicle interior sound can be predicted more accurately.

As shown in FIG. 8, the predicted vehicle interior sound in the present embodiment is very similar to the measured vehicle interior sound with regard to the relative relationship between primary peak positions and primary peak levels. Further, in the present embodiment, since the predicted vehicle interior sound is the sum of the contribution of the auto power spectrums of the tire axial force in three directions and the cross power spectrums between two different directions, the respective partial sounds are known. Accordingly, a superior effect is achieved in that the direction in which the tire axial force is to be reduced can be confirmed from the relative sizes of the partial sounds.

Compared to the case in which the road noise performance is predicted only from the axial force characteristics of a single tire, the predicted road noise of the present invention corresponds well to the actual road noise since the effect of the characteristics of the vehicle is taken into consideration. Accordingly, in a case in which there are various types of sample tires, instead of evaluating them in an actual vehicle test, the quality of the actual vehicle road noise performance can be predicted by a simple experiment using one tire, and the manpower needed for evaluation and the development period can be reduced.

What is claimed is:

1. A method of predicting vehicle interior noise, comprising:

obtaining a frequency response function and a power spectrum in accordance with the following (a) and (b), wherein (a) an exciting force is applied to at least one axle of a vehicle on which standard tires are mounted in predetermined directions, the applied exciting force and a sound pressure of noise generated inside the vehicle due to the applied exciting force are measured, the frequency response function in which the exciting force in said predetermined directions serves as an input and the sound pressure of the noise generated inside the vehicle serves as an output is obtained, and (b) axial force whose directions are the same as said predetermined directions and which is generated at an axle when a tire which is to be subject to noise prediction is rotated in an axially fixed state on a drum testing machine having a surface simulating the unevenness of a road surface is measured, and the power spectrum relating to the measured axial force in said predetermined directions is obtained; and on the basis of said frequency response function and said power spectrum, predicting vehicle interior noise which is generated when a vehicle runs on the road surface.

2. The method of predicting vehicle interior noise according to claim 1, wherein said frequency response function and said power spectrum relating to said axial force in said predetermined directions are multiplied for every predetermined direction and for every position at which a tire is mounted, and the obtained products are added together so as to predict the interior noise of a vehicle.

3. The method of predicting vehicle interior noise according to claim 1, wherein said predetermined directions are any one of the following: three orthogonal axial directions comprising an axis in the longitudinal direction of the vehicle, an axis in the transverse direction of the vehicle, and an axis in the vertical direction of the vehicle; six directions comprising the three orthogonal axial directions and directions encircling the three orthogonal axial directions and; selected directions from among the three orthogonal axial directions and the directions encircling the three orthogonal axes.

4. A method of predicting vehicle interior noise, comprising:

obtaining a frequency response function, an auto power spectrum, and a cross power spectrum in accordance with the following (a) and (b), wherein (a) an exciting force is applied to at least one axle of a vehicle on which standard tires are mounted in three orthogonal axial directions, for each of three orthogonal axes, the applied exciting force and a sound pressure of noise generated inside the vehicle due to the applied exciting force are measured, the frequency response function in which the exciting force in said three orthogonal axial directions serves as an input and the sound pressure of the noise generated inside the vehicle serves as an output is obtained for each of the three orthogonal axes, and (b) axial force in said three orthogonal axial directions which is generated at an axle when a tire which is to be subject to noise prediction is rotated in an axially fixed state on a drum testing machine having a surface simulating the unevenness of a road surface is measured for each of the three orthogonal axes, and an auto power spectrum of the measured axial force in each of said three orthogonal axial directions and a cross power spectrum in the direction between two different axes of the three orthogonal axes are obtained; and on the basis of said frequency response function, said power spectrum, and said cross power spectrum, predicting vehicle interior noise which is generated when the vehicle runs on the road surface.

5. The method of predicting vehicle interior noise according to claim 4, wherein said frequency response function is multiplied by said auto power spectrum and said frequency response function is multiplied by said cross power spectrum for every related predetermined direction and for every related position at which a tire is mounted, and the obtained products are added together so as to predict the interior noise of the vehicle.

6. An apparatus for predicting vehicle interior noise, comprising:

excitation means which applies exciting force in predetermined directions to at least one axle of a vehicle on which standard tires are mounted;

first measuring means which measures the applied exciting force and a sound pressure of noise generated inside a vehicle due to the exciting force;

function operating means which operates the frequency response function in which the exciting force in said predetermined directions serves as an input and the sound pressure of the noise generated inside the vehicle serves as an output;

a drum testing machine which has a surface simulating the unevenness of a road surface;

second measuring means for measuring an axial force whose directions are the same as said predetermined directions and which is generated at an axle when a tire which is to be subject to noise prediction is rotated on said drum testing machine in an axially fixed state;

spectrum operating means which operates the power spectrum relating to the measured axial force in said predetermined directions; and predicting means which, on the basis of said frequency response function and said power spectrum, predicts the vehicle interior noise which is generated when the vehicle runs on the road surface.

7. The apparatus for predicting vehicle interior noise according to claim 6, wherein said excitation means comprises:

an exterior jig for striking an axle which includes an impact portion and a disk portion and which is mounted on the rim of a tire; and an impulse hammer which includes a force sensor for detecting excitation force due to impact and which strikes the impact portion of said exterior jig for striking an axle.

8. The apparatus for predicting vehicle interior noise according to claim 6, wherein said frequency response function and said power spectrum relating to the measured axial force in said predetermined directions are multiplied for every predetermined direction and for every position at which a tire is mounted, and the obtained products are added together so as to predict the interior noise of a vehicle.

9. The apparatus for predicting vehicle interior noise according to claim 6, wherein said predetermined directions are any one of the following: three orthogonal axial directions comprising an axis in the longitudinal direction of the vehicle, an axis in the transverse direction of the vehicle, and an axis in the vertical direction of the vehicle; six directions comprising the three orthogonal axial directions and directions encircling the three orthogonal axial directions and; selected directions from among the three orthogonal axial directions and the directions encircling the three orthogonal axes.

10. An apparatus for predicting vehicle interior noise, comprising:

excitation means which applies exciting force in three orthogonal directions to at least one axle of a vehicle, on which standard tires are mounted, for each of three orthogonal axes;

first measuring means which measures the applied exciting force and a sound pressure of noise generated inside a vehicle due to the applied exciting force for each of the three orthogonal axes;

function operating means which operates a frequency response function for each of the three orthogonal axes in which the applied exciting force in the three orthogonal directions serves as an input and the sound pressure of the noise generated inside the vehicle serves as an output;

a drum testing machine which has a surface simulating the unevenness of a road surface;

spectrum operating means for measuring, for each of the three orthogonal axes, the axial force in the three orthogonal axial directions which is generated at a shaft when a noise prediction subject tire is rotated on said drum testing machine in an axially fixed state, and for operating an auto power spectrum of the measured axial force in each of the three orthogonal axial directions and a cross power spectrum in the direction between two different axes of the three orthogonal axes; and predicting means which, on the basis of said frequency response function, said auto power spectrum, and said cross power spectrum, predicts the vehicle interior noise which is generated when the vehicle runs on the road surface.

11. The apparatus for predicting vehicle interior noise according to claim 10, wherein said excitation means comprises:

an exterior jig for striking an axle which includes an impact portion and a disk portion and which is mounted on the rim of a tire; and an impulse hammer which includes a force sensor detecting excitation force due to impact and which strikes the impact portion of said exterior jig for striking an axle.

12. The apparatus for predicting vehicle interior noise according to claim 10, wherein said frequency response function is multiplied by said auto power spectrum and said frequency response function is multiplied by said cross power spectrum for every related predetermined direction and for every related position at which a tire is mounted, and the obtained products are added together so as to predict the interior noise of the vehicle.

* * * * *